(12) United States Patent
Sovani et al.

(10) Patent No.: US 12,299,362 B2
(45) Date of Patent: May 13, 2025

(54) SYSTEM AND METHODS FOR PREDICTING OVERHEATING FOR ADDITIVE MANUFACTURING USING SIMULATION

(71) Applicant: MATERIALISE N.V., Leuven (BE)

(72) Inventors: Yogesh Sovani, Leuven (BE); Manuel Michiels, Leuven (BE)

(73) Assignee: MATERIALISE N.V., Leuven (BE)

(*) Notice: Subject to any disclaimer, the term of this patent is extended or adjusted under 35 U.S.C. 154(b) by 883 days.

(21) Appl. No.: 17/477,140

(22) Filed: Sep. 16, 2021

(65) Prior Publication Data

US 2022/0004687 A1    Jan. 6, 2022

Related U.S. Application Data

(63) Continuation of application No. PCT/US2020/023149, filed on Mar. 17, 2020.
(Continued)

(51) Int. Cl.
| | | |
|---|---|---|
| G06F 30/23 | (2020.01) | |
| B22F 10/28 | (2021.01) | |
| B22F 10/80 | (2021.01) | |
| B29C 64/153 | (2017.01) | |
| B29C 64/386 | (2017.01) | |
| B33Y 50/00 | (2015.01) | |
| G06F 111/10 | (2020.01) | |

(Continued)

(52) U.S. Cl.
CPC ............ *G06F 30/23* (2020.01); *B22F 10/80* (2021.01); *B29C 64/386* (2017.08); *B33Y 50/00* (2014.12); *B22F 10/28* (2021.01); *B29C 64/153* (2017.08); *G06F 2111/10* (2020.01); *G06F 2119/08* (2020.01); *G06F 2119/18* (2020.01)

(58) Field of Classification Search
None
See application file for complete search history.

(56) References Cited

FOREIGN PATENT DOCUMENTS

| WO | WO-2014095872 A1 * | 6/2014 | ........... B29C 64/135 |
|---|---|---|---|
| WO | 2018140019 A1 | 8/2018 | |
| WO | 2019050518 A1 | 3/2019 | |

OTHER PUBLICATIONS

Hongwei Hu, Numerical analysis of heat transfer during multi-layer selective laser melting of AlSi10Mg, Jul. 7, 2016 (Year: 2016).*

(Continued)

*Primary Examiner* — Emerson C Puente
*Assistant Examiner* — Michael Paul Mirabito
(74) *Attorney, Agent, or Firm* — Dinsmore & Shohl LLP (57) ABSTRACT

Systems and methods for predicting locations of overheating of one or more objects for build of the one or more objects by additive manufacturing using simulation. A method includes simulating temperature of an object as a function of spatial location during a layer by layer build using powder based additive manufacturing comprising determining a temperature over time at a plurality of locations of a plurality of layers of the object. The method further includes calculating, for each of the plurality of locations, an overheating index that is a function of each of a corresponding maximum temperature, thermal gradient, and heat modulus. The method further includes, based on one or more overheating indexes of one or more locations exceeding the threshold indicating overheating, adjusting a build of the object.

20 Claims, 9 Drawing Sheets

Related U.S. Application Data (60) Provisional application No. 62/822,611, filed on Mar. 22, 2019.

(51) Int. Cl.
 *G06F 119/08* (2020.01)
 *G06F 119/18* (2020.01)

(56) References Cited

OTHER PUBLICATIONS

Rishi Raj, Joule heating during flash-sintering, Mar. 15, 2012 (Year: 2012).*

Darya Kastsian, Reduction of local overheating in selective laser melting, Feb. 21, 2018 (Year: 2018).*

Mihir Samantaray, Computational modeling of heat transfer and sintering behavior during direct metal laser sintering of AlSi10Mg alloy powder, Aug. 20, 2018 (Year: 2018).*

* cited by examiner

SYSTEM AND METHODS FOR PREDICTING OVERHEATING FOR ADDITIVE MANUFACTURING USING SIMULATION

CROSS-REFERENCE TO RELATED APPLICATIONS

This application is a continuation of International Patent Application No. PCT/US2020/023149, filed Mar. 17, 2020, which claims the benefit of U.S. Provisional Patent Application No. 62/822,611, filed Mar. 22, 2019. The contents of each of these applications are hereby incorporated by reference in their entirety.

BACKGROUND OF THE INVENTION

Field of the Invention

This application relates to additive manufacturing. More particularly, this application relates to systems and methods for predicting locations of overheating of one or more objects for build of the one or more objects by additive manufacturing using simulation.

Description of the Related Technology

In the field of additive manufacturing, three dimensional solid objects are formed from a digital model. Because the manufactured objects are three dimensional, additive manufacturing is commonly referred to as three dimensional ("3D") printing. Some techniques for additive manufacturing include selective laser sintering ("LS") manufacturing and metal sintering. These techniques direct a laser beam to a specified location in order to polymerize or solidify layers of building materials which are used to create the desired three dimensional ("3D") object. The 3D object is built on a layer-by-layer basis by solidifying the layers of the building material.

It can be difficult at the design stage to know whether a particular object will be successfully built. For example, one common issue is that during the build of an object using additive manufacturing, certain locations on the object (e.g., in one or more layers) can experience overheating (also referred to as local overheating as it is localized to certain locations). Such local overheating can cause several different issues in the build of the object. For example, local overheating can burn the material being used to manufacture the object. This can lead to visual defects in the resulting object, such as defects in the surface color of the object.

In another example, local overheating can affect the cooling rate at those locations. For example, in areas of overheating, the rate at which an object cools at those locations is affected. Based on the cooling rate, defects may occur in the resulting object (e.g., at or near the areas of local overheating), such as defects in the structure (e.g., microstructure) of the resulting object. This can affect structural properties of the resulting object, such as hardness, shape, etc., and also lead to micro-level or macro level cracks in the resulting object.

Accordingly, local overheating during additive manufacturing can cause a resulting object to not conform to the expected designed object. Therefore, the design of object may need to be changed and the object manufactured again. This leads to waste of time and/or materials.

In view of these and other problems identified by the inventors, systems and methods that improve prediction of overheating for build using additive manufacturing are described herein.

SUMMARY

In one embodiment, a computer-implemented method for predicting overheating during build simulation for additive manufacturing is provided. The method includes a computer-implemented method for determining locations of overheating of an object in a simulated additive manufacturing build of the object. The method includes obtaining a finite element model of the object. The method includes simulating build of the object using the finite element model including determining a temperature over time at a plurality of locations of the object. The method includes, based on the determined temperature over time at the plurality of locations of the object: determining, for each of the plurality of locations, a maximum temperature based on the corresponding temperature over time; extracting, for each of the plurality of locations, a thermal gradient; and calculating, for each of the plurality of locations, a heat modulus. The method includes calculating, for each of the plurality of locations, an overheating index based on the corresponding maximum temperature, thermal gradient, and heat modulus.

Certain embodiments provide a non-transitory computer-readable medium having computer-executable instructions stored thereon, which, when executed by a processor of a computing device, cause the computing device to perform the described method.

Certain embodiments provide a computing device comprising a memory and a processor configured to perform the described method.

DETAILED DESCRIPTION OF CERTAIN INVENTIVE EMBODIMENTS

Systems and methods disclosed herein include techniques for predicting locations of overheating of one or more objects to be built using additive manufacturing. In particular, systems and methods disclosed herein provide techniques for simulation and analysis prior to build of the one or more objects that can predict locations of overheating that would occur during the build of the one or more objects using additive manufacturing. In certain embodiments, systems and methods disclosed herein further provide automated redesign of objects to prevent such overheating.

Though some embodiments described herein are described with respect to certain additive manufacturing techniques using certain building materials (e.g., metals), the described system and methods may also be used with certain other additive manufacturing techniques and/or certain other building materials as would be understood by one of skill in the art.

Computing devices can be used to simulate the build of an object using additive manufacturing. Such simulated builds of an object result in data about the build of the object. For example, a simulation of build of the object can output the temperature of the build of the object as a function of spatial location (e.g., with respect to a build area for the object) and time (e.g., Temp=f(x,y,z,t)). Certain embodiments herein provide techniques for utilizing such data about the build of the object to predict locations of overheating of the object. Such embodiments beneficially provide a technical solution to the technical problem in additive manufacturing of how to determine locations of overheating of one or more objects without having to actually build the object using additive manufacturing. Such embodiments improve the field of additive manufacturing by reducing the likelihood of failed builds of objects. Further, such techniques may have low computational complexity, and therefore may reduce the number of computing cycles needed to be performed by a computing device to predict locations of overheating. Further, embodiments that provide automated redesign of objects to prevent such overheating may further improve the field of additive manufacturing by reducing the likelihood of failed builds of objects.

Figure 1:
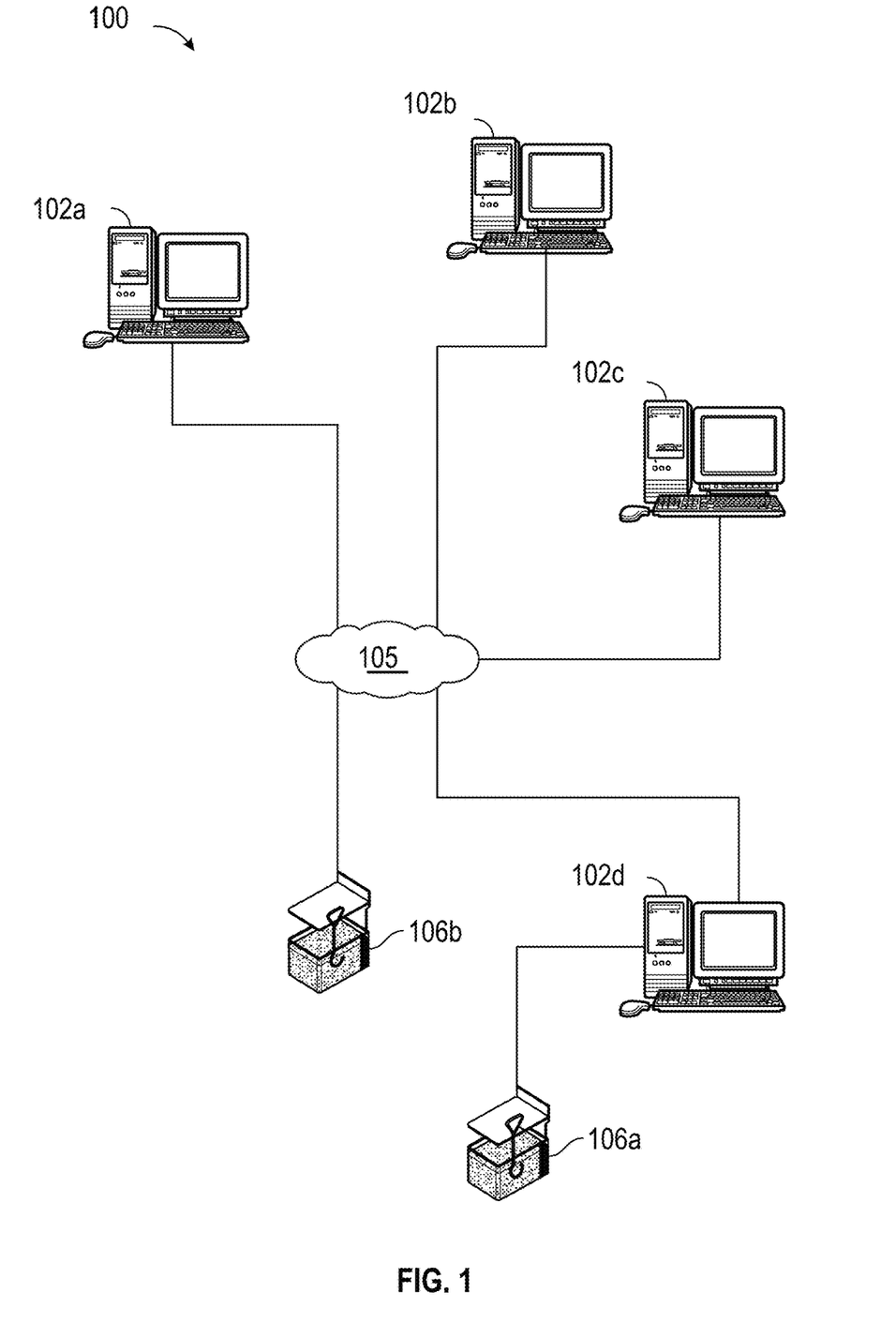
FIG. 1 is an example of a system for designing and manufacturing 3D objects.

Embodiments of the invention may be practiced within a system for designing, simulating, and manufacturing 3D objects. Turning to FIG. 1, an example of a computer environment suitable for the implementation of 3D object design, build simulation, and manufacturing is shown. The environment includes a system 100. The system 100 includes one or more computers 102a-102d, which can be, for example, any workstation, server, or other computing device capable of processing information. In some embodiments, each of the computers 102a-102d can be connected, by any suitable communications technology (e.g., an internet protocol), to a network 105 (e.g., the Internet). Accordingly, the computers 102a-102d may transmit and receive information (e.g., software, digital representations of 3-D objects, commands or instructions to operate an additive manufacturing device, etc.) between each other via the network 105.

The system 100 further includes one or more additive manufacturing devices (e.g., 3-D printers) 106a-106b. As shown the additive manufacturing device 106a is directly connected to a computer 102d (and through computer 102d connected to computers 102a-102c via the network 105) and additive manufacturing device 106b is connected to the computers 102a-102d via the network 105. Accordingly, one of skill in the art will understand that an additive manufacturing device 106 may be directly connected to a computer 102, connected to a computer 102 via a network 105, and/or connected to a computer 102 via another computer 102 and the network 105.

It should be noted that though the system 100 is described with respect to a network and one or more computers, the techniques described herein also apply to a single computer 102, which may be directly connected to an additive manufacturing device 106.

Figure 2:
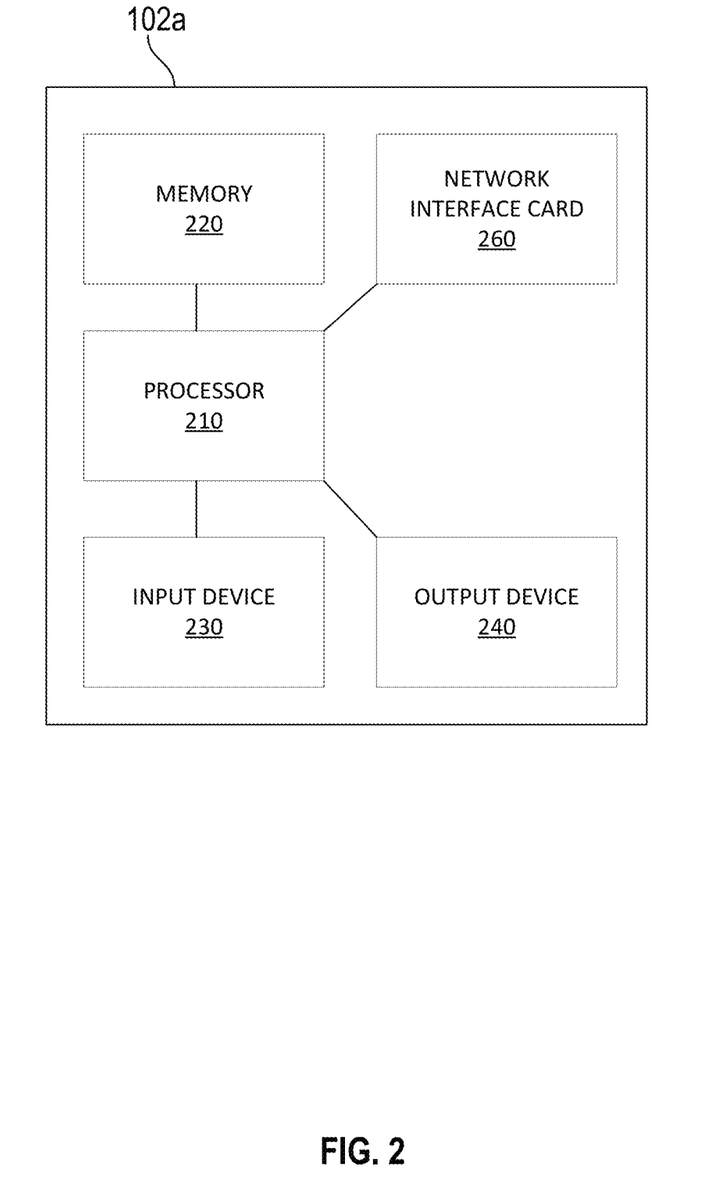
FIG. 2 illustrates a functional block diagram of one example of the computer shown in FIG. 1.

FIG. 2 illustrates a functional block diagram of one example of a computer of FIG. 1. The computer 102a includes a processor 210 in data communication with a memory 220, an input device 230, and an output device 240. In some embodiments, the processor is further in data communication with an optional network interface card 260. Although described separately, it is to be appreciated that functional blocks described with respect to the computer 102a need not be separate structural elements. For example, the processor 210 and memory 220 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, flash memory, etc.

The processor 210 also may be coupled to an input device 230 and an output device 240 for, respectively, receiving input from and providing output to a user of the computer 102a. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 also decodes data received via a network according to one or more data transmission protocols. The network interface card 260 can include a transmitter, receiver, or both. In other embodiments, the transmitter and receiver can be two separate components. The network interface card 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
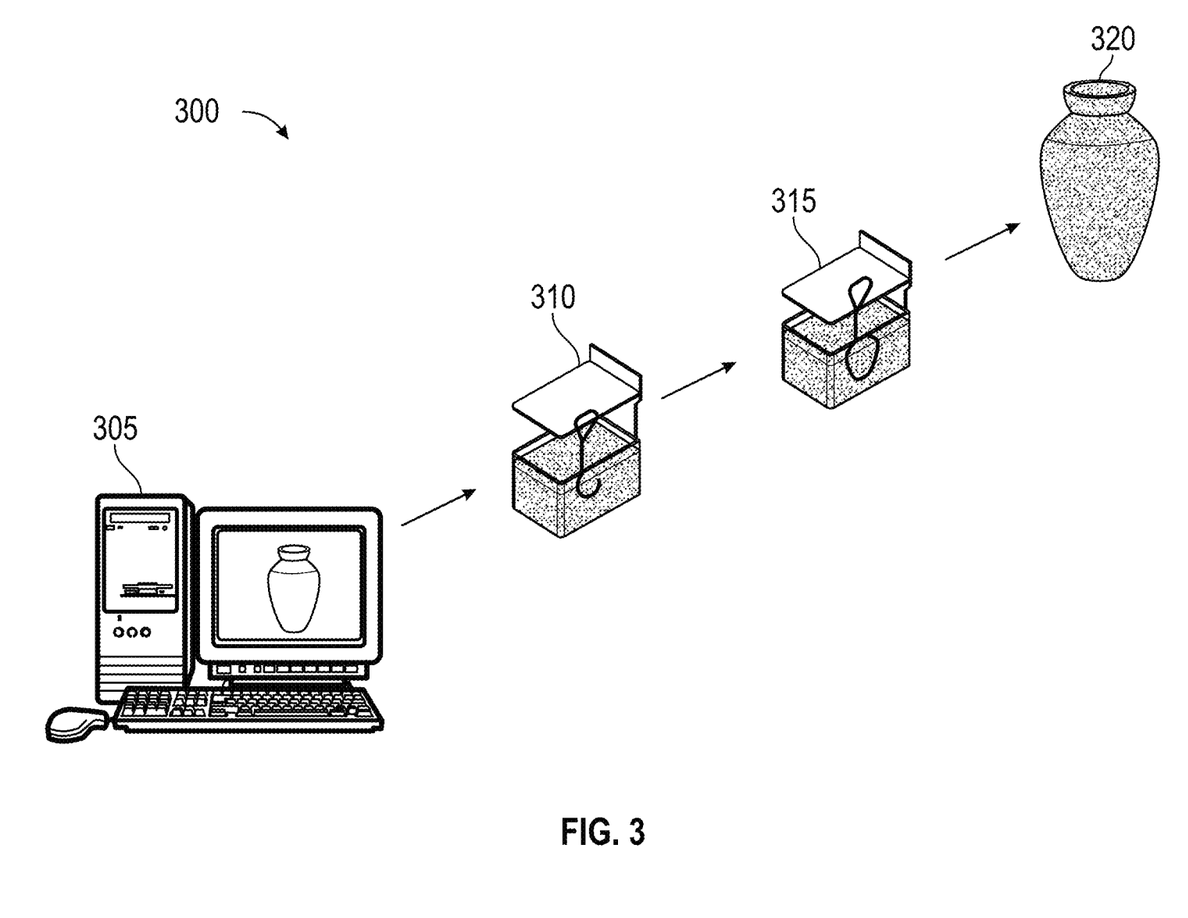
FIG. 3 shows a high level process for manufacturing a 3D object using additive manufacturing.

FIG. 3 illustrates a process 300 for manufacturing a 3-D object or device. As shown, at a step 305, a digital representation of the object is designed using a computer, such as the computer 102a. For example, 2-D or 3-D data may be input to the computer 102a for aiding in designing the digital representation of the 3-D object. Continuing at a step 310, information is sent from the computer 102a to an additive manufacturing device, such as additive manufacturing device 106, and the device 106 commences the manufacturing process in accordance with the received information. At a step 315, the additive manufacturing device 106 continues manufacturing the 3-D object using suitable materials, such as a polymer or metal powder. Further, at a step 320, the 3-D object is generated.

Figure 4A:
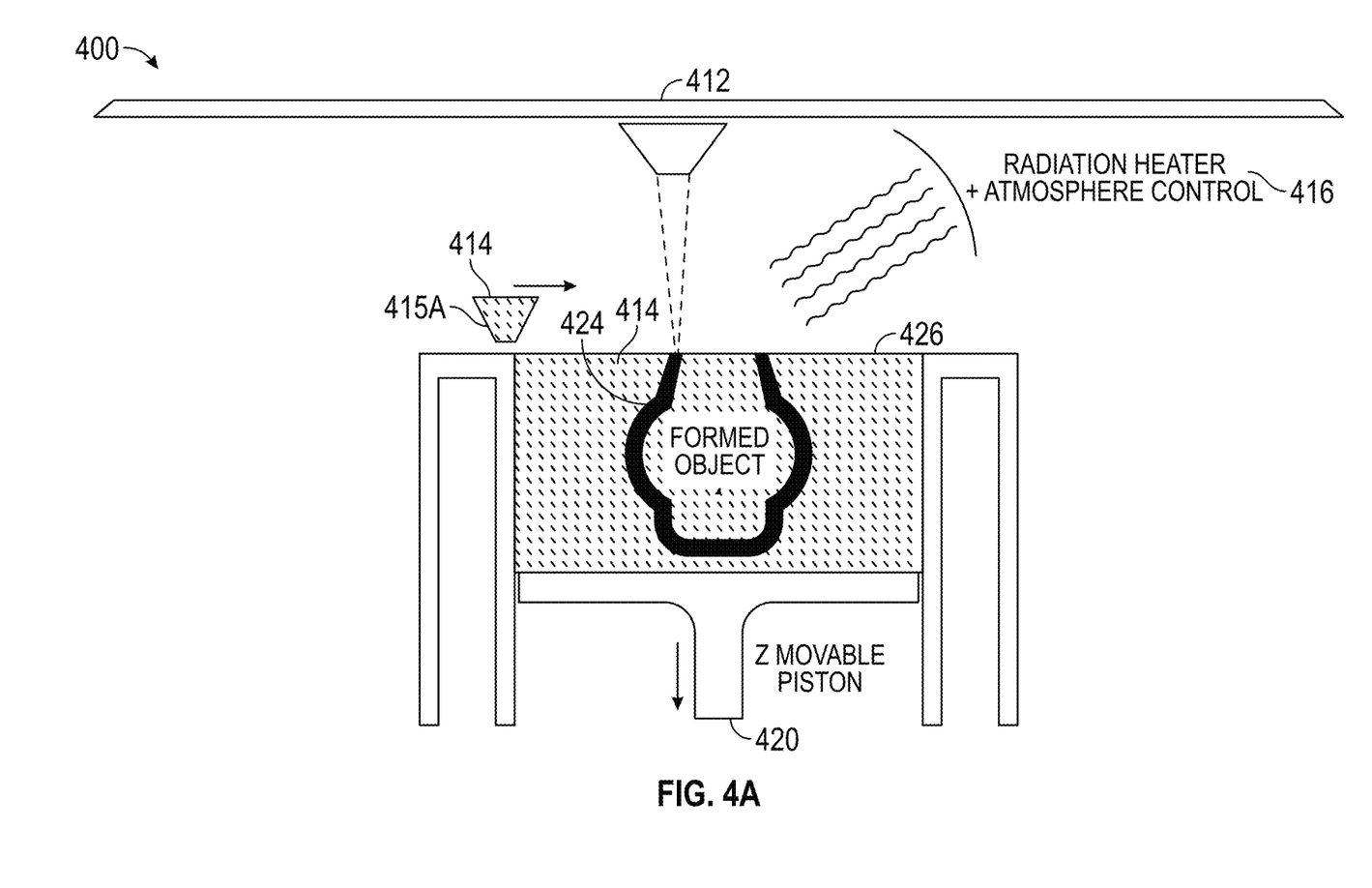
FIG. 4A is an example of an additive manufacturing apparatus with a recoating mechanism.

FIG. 4A illustrates an exemplary additive manufacturing apparatus 400 for generating a three-dimensional (3-D) object. In this example, the additive manufacturing apparatus 400 is a laser sintering device. The laser sintering device 400 may be used to generate one or more 3D objects layer by layer. The laser sintering device 400, for example, may utilize a powder (e.g., metal, polymer, etc.), such as the powder 414, to build an object a layer at a time as part of a build process.

Successive powder layers are spread on top of each other using, for example, a recoating mechanism 415A (e.g., a recoater blade). The recoating mechanism 415A deposits powder for a layer as it moves across the build area, for example in the direction shown, or in the opposite direction if the recoating mechanism 415A is starting from the other side of the build area, such as for another layer of the build. After deposition, a computer-controlled CO2 laser beam scans the surface and selectively binds together the powder particles of the corresponding cross section of the product. In some embodiments, the laser scanning device 412 is an X-Y moveable infrared laser source. As such, the laser source can be moved along an X axis and along a Y axis in order to direct its beam to a specific location of the top most layer of powder. Alternatively, in some embodiments, the laser scanning device 412 may comprise a laser scanner which receives a laser beam from a stationary laser source, and deflects it over moveable mirrors to direct the beam to a specified location in the working area of the device. During laser exposure, the powder temperature rises above the material (e.g., glass, polymer, metal) transition point after which adjacent particles flow together to create the 3D object. The device 400 may also optionally include a radiation heater (e.g., an infrared lamp) and/or atmosphere control device 416. The radiation heater may be used to preheat the powder between the recoating of a new powder layer and the scanning of that layer. In some embodiments, the radiation heater may be omitted. The atmosphere control device may be used throughout the process to avoid undesired scenarios such as, for example, powder oxidation.

Figure 4B:
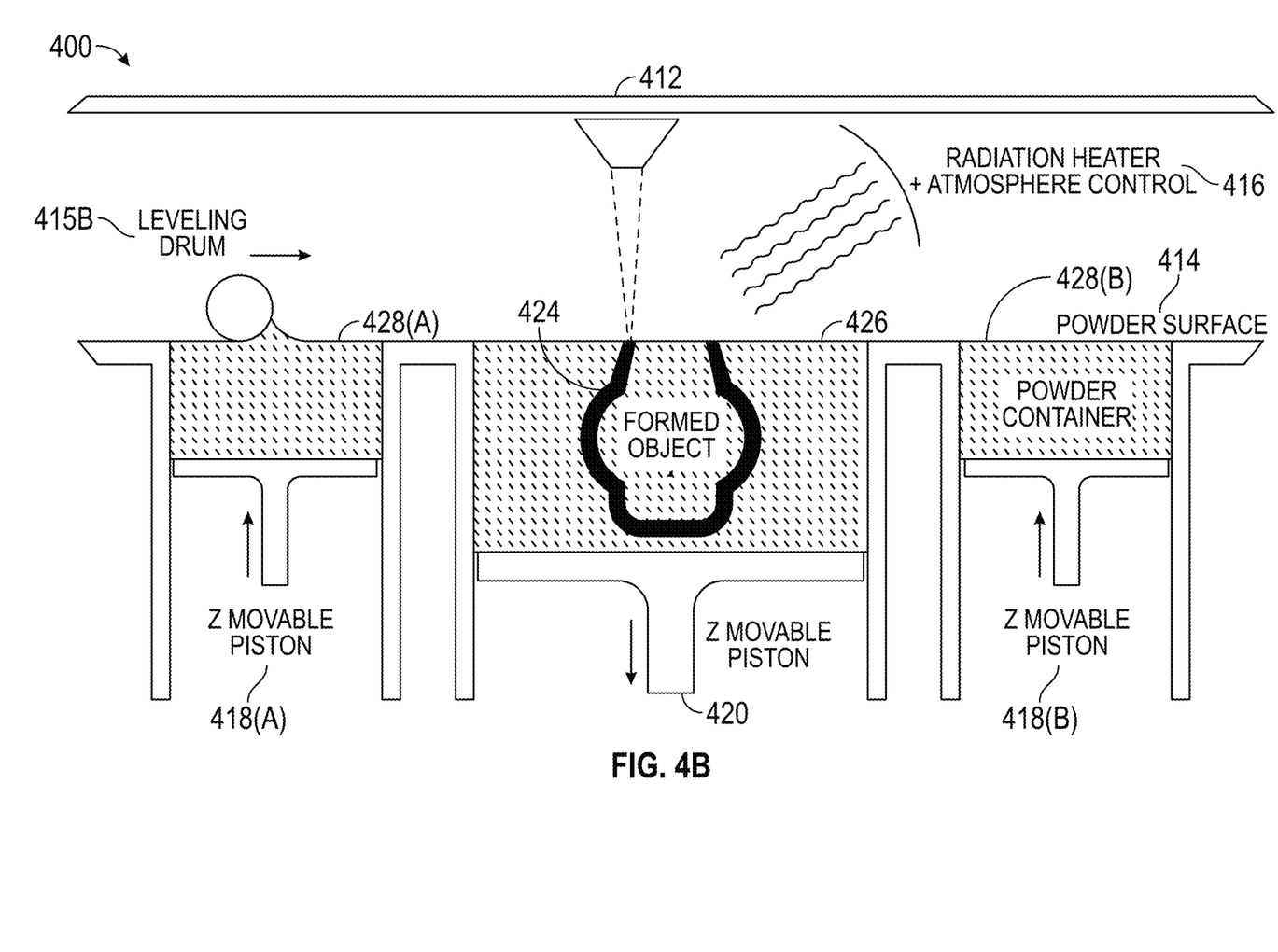
FIG. 4B is another example of an additive manufacturing apparatus with a recoating mechanism.

In some other embodiments, such as shown with respect to FIG. 4B, a recoating mechanism 415B (e.g., a leveling drum/roller) may be used instead of the recoating mechanism 415A. Accordingly, the powder may be distributed using one or more moveable pistons 418(a) and 418(b) which push powder from a powder container 428(a) and 428(b) into a reservoir 426 which holds the formed object 424. The depth of the reservoir, in turn, is also controlled by a moveable piston 420, which increases the depth of the reservoir 426 via downward movement as additional powder is moved from the powder containers 428(a) and 428(b) in to the reservoir 426. The recoating mechanism 415B, pushes or rolls the powder from the powder container 428(a) and 428(b) into the reservoir 426. Similar to the embodiment shown in FIG. 4A, the embodiment in FIG. 4B may use the radiation heater alone for preheating the powder between recoating and scanning of a layer.

In certain embodiments, a suitable computing device, such as computer 102, simulates a build of an object to be built using additive manufacturing. For example, in certain embodiments, the computing device uses numerical (e.g., finite element method (FEM) or finite element analysis (FEA)) simulation (e.g., macro layer based tetrahedral or voxel/hex mesh simulation) of building an object on a layer by layer basis. For example, simulating a build of an object as discussed herein may be performed using such numerical simulation to generate a simulated model of the object.

For example, a digital finite element model (e.g., FEM model) of the object is input into a simulation program (e.g., a known simulation program that uses FEM, such as Anasys, Abaqus, Marc, etc.) running on the computing device. A digital finite element model may be obtained from a storage, generated by a user, or generated from a simulation program, such as by inputting a different digital model/representation of the object (e.g., CAD file, STL file, etc.) into the simulation program, which then generates the finite element model. The simulation program uses the finite element model to perform FEM simulation of a build of the object.

The simulation program, based on the finite element model of the object discussed, performs FEM simulation of a build of the object and outputs a simulated model of the object comprising simulation of the layers including parameters (e.g., amount of shrinkage, displacement, reaction force, stresses, strains, temperature over time, heat loss, etc.) for different locations (e.g., nodes or regions (e.g., at different X-Y coordinates of an X-Y plane corresponding to a layer)) of each layer of the object.

In one example, the parameters for different locations of each layer of the object include a temperature as a function of time for each spatial location of the object within the build area. For example, the simulation program running on the computing device utilizes a conduction equation and a heat loss equation to generate the temperature T as a function f of the spatial coordinates of the location (e.g., x, y, z coordinates, where z indicates the layer depth within the build area, and x and y indicate the X-Y within the build area) and time t.

In one example, the conduction equation is as follows:

$$\frac{\partial}{\partial x}\left(k\frac{\partial T}{\partial x}\right) + \frac{\partial}{\partial y}\left(k\frac{\partial T}{\partial y}\right) + \frac{\partial}{\partial z}\left(k\frac{\partial T}{\partial z}\right) + Q = \rho C \frac{\partial T}{\partial t}$$

where $\rho$, C and k refer to density, specific heat, and thermal conductivity of the build material, respectively and Q is heat flux applied (e.g., by the laser scanning device of the additive manufacturing apparatus).

In one example, the heat loss equation is as follows:

$$k\left(\frac{\partial T}{\partial n}\right) - q_s + h_{conv}(T - T_{amb}) + \sigma\varepsilon(T^4 - T_0^4) = 0$$

where k $$\left(\frac{\partial T}{\partial n}\right)$$

is heat loss due to conduction from the surface whose unit normal is n;

$q_s$ is heat flux as in heat input;

$h_{conv}(T-T_{amb})$ is heat loss due to convection;

$\sigma\varepsilon(T^4-T_0^4)$ is heat loss due to radiation; and k, $h_{conv}$, $\sigma$, $\varepsilon$, and $T_0/T_{amb}$ refer to thermal conductivity, convective heat transfer co-efficient, Stefan-Boltzmann constant, emissivity, and ambient temperature, respectively.

The conduction equation and heat loss equation can be solved at every time increment t for every spatial location to solve for T=f(x,y,z,t), thereby indicating the temperature at each location over time for simulated build of the object.

Certain aspects herein provide techniques for utilizing the information regarding temperature over time for spatial locations of a simulated build of an object to predict which locations are likely to have overheating.

In certain embodiments, the temperature over time for spatial locations of a simulated build of an object is used to determine a maximum temperature at each spatial location. A thermal gradient for each location for the time that the maximum temperature is reached is also determined. Based on the maximum temperature and thermal gradient for each location, heat accumulation for the location is determined (e.g., as an index of heat accumulation, such as maximum temperature divided by thermal gradient). In certain aspects, the index is further based on heat modulus.

Figure 5:
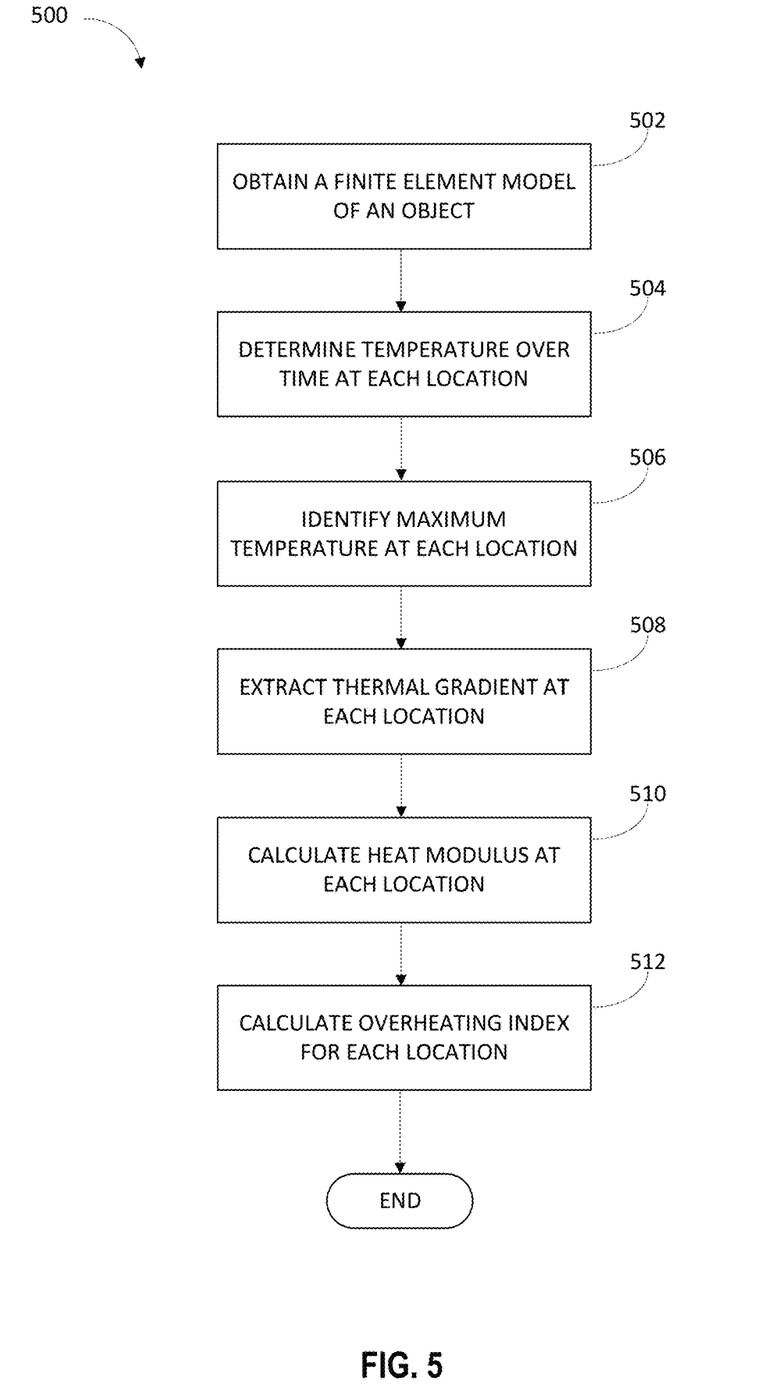
FIG. 5 is a flowchart of an example process for predicting locations likely to have overheating during build of an object using additive manufacturing, according to an embodiment.

FIG. 5 is a flowchart of an example process 500 for predicting locations likely to have overheating during build of an object using additive manufacturing. The process 500 may be performed by a suitable computing device, such as a computer 102. It should be noted that though the process 500 is described with respect to predicting overheating for each location of an object, in certain embodiments, less than all locations (e.g., a plurality of locations) are predicted.

At block 502, the computing device obtains a finite element model of an object. At block 504, the computing device simulates a build of the object (e.g., by performing FEM simulation as discussed) and determines the temperature over time at each location (or a plurality of locations less than all locations) of the object for the simulation.

At block 506, the computing device identifies a maximum temperature at each location. The maximum temperature is the maximum temperature reached at the location over time of the simulated build. For example, heat input as modelled (e.g., from a simulated laser source of an additive manufacturing device) may be the same for each layer of the object. Accordingly, when a layer is being deposited, it reaches a maximum temperature. This maximum temperature is accumulated at each location of the object over time for the simulation.

At block 508, the computing device, for each location of the object, extracts a thermal gradient (e.g., in a Z direction that is perpendicular to the build platform and the direction in which layers are built up at the time) at the time when the location was at the identified maximum temperature. For example, the thermal gradient in the Z direction is the most dominant thermal gradient that affects heat accumulation. In certain aspects, the thermal gradient is extracted from the conduction equation and heat loss equation. In certain aspects, thermal gradient $$\frac{\partial T}{\partial z}$$

in the Z direction is calculated as follows:

$$\frac{\partial T}{\partial z} = \frac{T_A - T_B}{\Delta z}$$

where $T_A$ is the temperature at a first layer at location (e.g., x-y location), $T_B$ is the temperature at a second layer at the location (e.g., the second layer being the previous layer on which the first layer is deposited), and $\Delta z$ is the distance between the first layer and the second layer.

Continuing, at block 510, the computing device, for each location of the object, calculates a heat modulus. In certain embodiments, heat modulus is a geometrical factor calculated as the ratio of layer volume (e.g., proportional to heat accumulation in the layer) to layer bottom area contributing to the heat losses (e.g., proportional to area available for heat conduction loss).

At block 512, the computing device, for each location of the object, calculates an overheating index based on a function of the maximum temperature, thermal gradient, and heat modulus at the location. For example, the overheating index can be calculated as (maximum_temperature/thermal gradient)*heat modulus.

The overheating index of each location can be indicative of whether overheating is likely to occur at the given location. For example, if the overheating index is greater than a threshold for a given location, the computing device determines that overheating is likely to occur at the given location. Further, if the overheating index is less than the threshold for a given location, the computing device determines that overheating is not likely to occur at the given location. In certain aspects, the computing device is configured to provide a warning (e.g., audio, visual, etc.) to a user indicating locations having a heat index indicative of likely overheating. The user may then be able to manually take corrective action, such as changing build parameters (e.g., scanning patterns, scan times, orientation of the object with respect to the build platform, etc.) or changing a design of the object (e.g., adding/removing/changing location of supports, changing shape or size of features, etc.) to correct the location of overheating, such that overheating no longer occurs.

Figure 6:
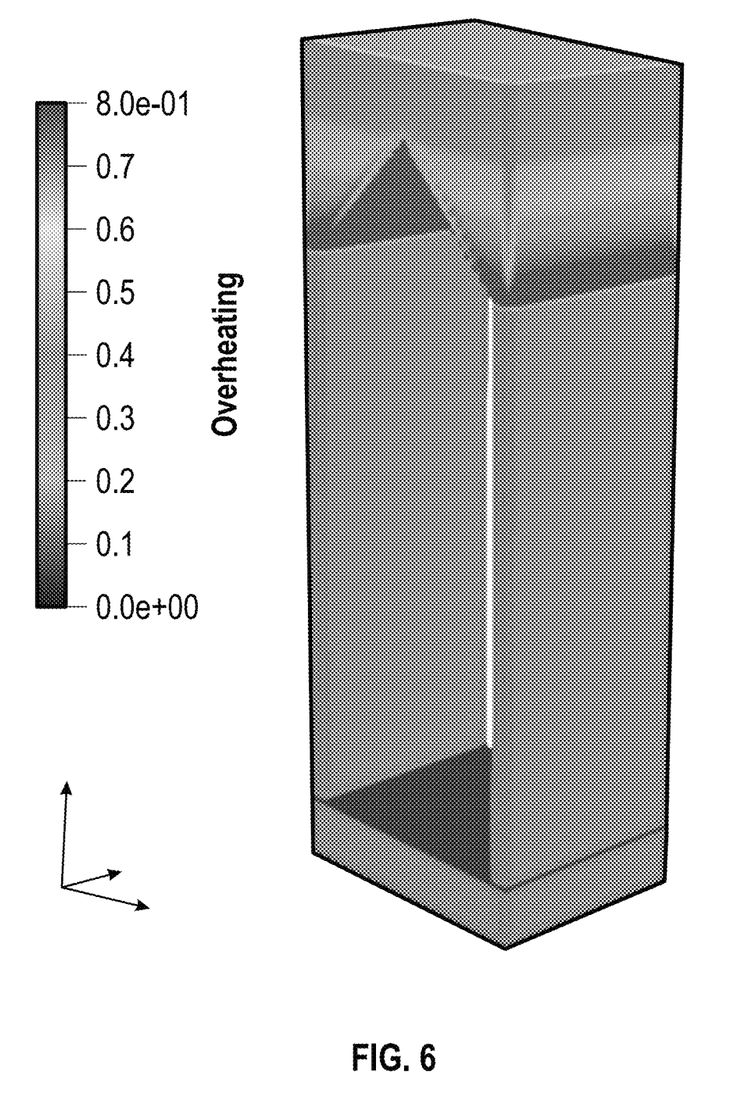
FIG. 6 illustrates a graphical representation of overheating index at different locations of the object for the simulated build, according to an embodiment.

In certain embodiments, the computing device is configured to display/represent the overheating data, such as the determined overheating index, for each location in graphical form. For example, FIG. 6 represents the overheating index at different locations of the object for the simulated build. The overheating index for each location may be represented by a different color, shade, or number output at the location on a digital representation of the object.

Figure 7:
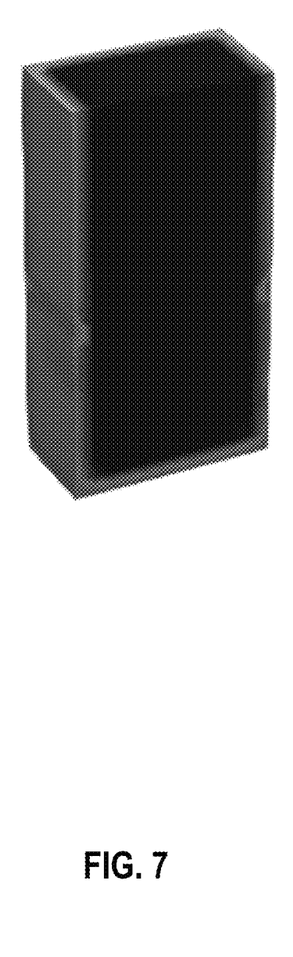
FIG. 7 illustrates an object design that does not experience locations of overheating, according to an embodiment.
Figure 8:
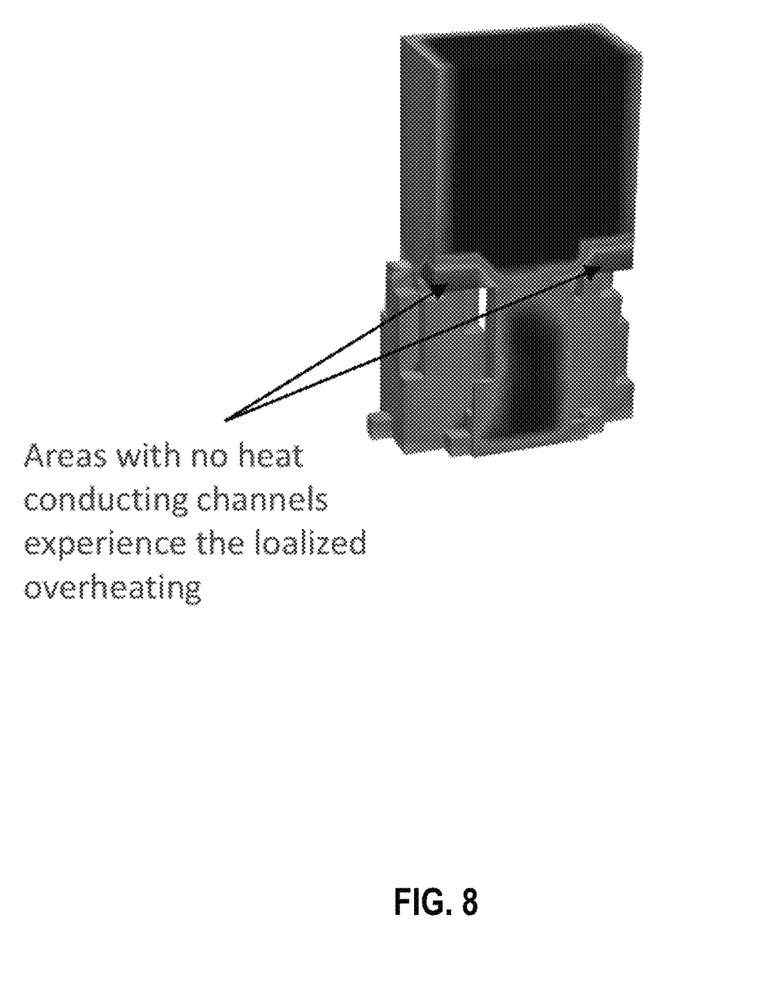
FIG. 8 illustrates an object design that does experience locations of overheating, according to an embodiment.

In certain embodiments, heat accumulation and overheating occur due to a sudden change in the cross-section of the object being built, such as at the interface point between a support and the main section of the object. For example, as shown in FIG. 7, there are no sudden changes in cross-section of the object, and therefore no locations of overheating occur. However, as shown in FIG. 8, there is a sudden change in the cross-section at the interface point between a support and the main section of the object, leading to overheating in these locations.

As discussed, in certain embodiments, systems and methods disclosed herein further provide automated redesign of objects to prevent such overheating.

In certain embodiments, for locations that the computing device determines are likely to have overheating, such as discussed, the computing device automatically takes corrective action regarding design of the object. For example, the computing device may automatically place one or more supports (e.g., shaped as cones) between the location likely to have overheating and another portion of the object, or the build platform. Additionally or alternatively, the computing device may set sudden changes in cross-section at locations likely to have overheating to be more gradual over additional layers by changing the design in certain layers. Additionally or alternatively, the computing device automatically reorients the object by rotating the object (e.g., by a certain amount in a certain direction), such as to lead to a less sudden change in cross-sections and better support design.

Further, alternatively or additionally to redesign of the object, systems and methods disclosed herein provide automated changing of build parameters for building an object to prevent overheating.

In certain embodiments, for locations that the computing device determines are likely to have overheating, such as discussed, the computing device automatically takes corrective action such as reducing the energy density (e.g., as provided by a laser source of an additive manufacturing device) at any location or layer where overheating is determined as likely to occur. For example, energy density E is calculated as follows:

$$E = \frac{P}{v * h * t}$$

where P is laser power (e.g., in W), v is scan speed (e.g., in mm/s), h is hatch spacing (e.g., in mm), and t is layer thickness (e.g., in mm).

Accordingly, the computing device may determine to reduce energy density by one or more of reducing power, increasing velocity, increasing hatch spacing (e.g., changing scanning strategy), or increasing layer thickness. The computing device may make such changes in a job file used for build of the object.

The computing device may then again perform the process (e.g., process 500) for determining the locations of likely overheating for the redesigned object and/or change build parameters. The computing device may iteratively keep redesigning the object and/or changing build parameters and performing the process until the computing device determines that there are no locations of overheating for the object. The computing device may then cause manufacture of the object as redesigned and/or using the changed build parameters.

Accordingly, the embodiments herein provide automated processes for correcting overheating issues for objects built using additive manufacturing.

Various embodiments disclosed herein provide for the use of a computer control system. A skilled artisan will readily appreciate that these embodiments may be implemented using numerous different types of computing devices, including both general purpose and/or special purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A computer-implemented method for determining locations of overheating of an object, the method comprising:

Simulating temperature of the object as a function of spatial location during a layer by layer build using powder based additive manufacturing comprising determining a temperature over time at a plurality of locations of a plurality of layers of the object;

based on the determined temperature over time at the plurality of locations:

determining, for each of the plurality of locations, a maximum temperature based on the corresponding temperature over time; and extracting, for each of the plurality of locations, a thermal gradient;

calculating, for each of the plurality of locations, a heat modulus comprising a ratio of a volume of a layer of the location to a bottom area of the layer;

calculating, for each of the plurality of locations, an overheating index that is a function of each of the corresponding maximum temperature, thermal gradient, and heat modulus; and automatically redesigning the object by one or more of placing one or more supports or reorienting the object with respect to a build platform based on determining at least one overheating index exceeds a threshold indicating a location likely to experience overheating;

and recalculating, for each of the plurality of locations, the overheating index based on the redesigned object; and automatically reducing energy density at one or more locations based on determining corresponding one or more overheating indexes of the one or more locations exceed the threshold indicating overheating; and recalculating, for each of the plurality of locations, the overheating index based on the reduced energy density at the one or more locations.

2. The method of claim 1, wherein determining the temperature over time is based on a conduction equation and a heat loss equation.

3. The method of claim 1, wherein the maximum temperature is the maximum temperature reached at the location over time of the layer by layer build.

4. The method of claim 1, wherein the thermal gradient is in a direction perpendicular to the build platform.

5. The method of claim 1, wherein the thermal gradient is extracted from a conduction equation and a heat loss equation.

6. The method of claim 1, further comprising displaying the overheating index for each of the plurality of locations as represented by a color, shade, or number output at the location on a digital representation of the object.

7. The method of claim 1, wherein the performing at least one of comprises:
automatically redesigning the object by the one or more of placing the one or more supports or reorienting the object with respect to the build platform based on determining the at least one overheating index exceeds the threshold indicating the location likely to experience overheating; and
recalculating, for each of the plurality of locations, the overheating index based on the redesigned object.

8. The method of claim 7, further comprising automatically iteratively redesigning the object until it is determined no overheating index indicates overheating.

9. The method of claim 1, wherein the performing at least one of comprises:
automatically reducing energy density at the one or more locations based on determining the corresponding one or more overheating indexes of the one or more locations exceed the threshold indicating overheating; and
recalculating, for each of the plurality of locations, the overheating index based on the reduced energy density at the one or more locations.

10. The method of claim 9, further comprising automatically iteratively reducing energy density at one or more locations until it is determined no overheating index indicates overheating.

11. The method of claim 1, further comprising causing manufacturing of the object using additive manufacturing.

12. A non-transitory computer-readable medium having computer-executable instructions stored thereon, which, when executed by one or more processors of a computing device, cause the computing device to perform a method of determining locations of overheating of an object, the method comprising:
Simulating temperature of the object as a function of spatial location during a layer by layer build using powder based additive manufacturing comprising determining a temperature over time at a plurality of locations of a plurality of layers of the object;
based on the determined temperature over time at the plurality of locations:
determining, for each of the plurality of locations, a maximum temperature based on the corresponding temperature over time; and
extracting, for each of the plurality of locations, a thermal gradient;
calculating, for each of the plurality of locations, a heat modulus comprising a ratio of a volume of a layer of the location to a bottom area of the layer;
calculating, for each of the plurality of locations, an overheating index that is a function of each of the corresponding maximum temperature, thermal gradient, and heat modulus; and
automatically redesigning the object by one or more of placing one or more supports or reorienting the object with respect to a build platform based on determining at least one overheating index exceeds a threshold indicating a location likely to experience overheating; and recalculating, for each of the plurality of locations, the overheating index based on the redesigned object; and
automatically reducing energy density at one or more locations based on determining corresponding one or more overheating indexes of the one or more locations exceed the threshold indicating overheating; and recalculating, for each of the plurality of locations, the overheating index based on the reduced energy density at the one or more locations.

13. The non-transitory computer-readable medium of claim 12, wherein the performing at least one of comprises:
automatically redesigning the object by the one or more of placing the one or more supports or reorienting the object with respect to the build platform based on determining the at least one overheating index exceeds the threshold indicating the location likely to experience overheating; and
recalculating, for each of the plurality of locations, the overheating index based on the redesigned object.

14. A computing device comprising:
one or more memories; and
one or more processors configured to:
Simulate temperature of the object as a function of spatial location during a layer by layer build using powder based additive manufacturing comprising determining a temperature over time at a plurality of locations of a plurality of layers of the object;
based on the determined temperature over time at the plurality of locations:
determine, for each of the plurality of locations, a maximum temperature based on the corresponding temperature over time; and
extract, for each of the plurality of locations, a thermal gradient;
calculate, for each of the plurality of locations, a heat modulus comprising a ratio of a volume of a layer of the location to a bottom area of the layer;
calculate, for each of the plurality of locations, an overheating index that is a function of each of the corresponding maximum temperature, thermal gradient, and heat modulus; and
automatically redesign the object by one or more of placing one or more supports or reorienting the object with respect to a build platform based on determining at least one overheating index exceeds a threshold indicating a location likely to experience overheating; and recalculating, for each of the plurality of locations, the overheating index based on the redesigned object; and
automatically reduce energy density at one or more locations based on determining corresponding one or more overheating indexes of the one or more locations exceed the threshold indicating overheating; and recalculating, for each of the plurality of locations, the overheating index based on the reduced energy density at the one or more locations.

15. The computing device of claim 14, wherein the one or more processors are further configured to display the overheating index for each of the plurality of locations as represented by a color, shade, or number output at the location on a digital representation of the object.

16. The computing device of claim 14, wherein to perform the at least one of, the one or more processors are configured to:
automatically redesign the object by the one or more of placing the one or more supports or reorienting the object with respect to the build platform based on determining the at least one overheating index exceeds the threshold indicating the location likely to experience overheating; and
recalculate, for each of the plurality of locations, the overheating index based on the redesigned object.

17. The computing device of claim 16, wherein the one or more processors are further configured to automatically iteratively redesign the object until it is determined no overheating index indicates overheating.

18. The computing device of claim 14, wherein to perform the at least one of, the one or more processors are configured to:
automatically reduce energy density at the one or more locations based on determining the corresponding one or more overheating indexes of the one or more locations exceed the threshold indicating overheating; and
recalculate, for each of the plurality of locations, the overheating index based on the reduced energy density at the one or more locations.

19. The computing device of claim 18, wherein the one or more processors are further configured to automatically iteratively reduce energy density at one or more locations until it is determined no overheating index indicates overheating.

20. The computing device of claim 14, wherein the one or more processors are further configured to cause manufacturing of the object using additive manufacturing.

\* \* \* \* \*